(12) United States Patent
Lin

(10) Patent No.: US 7,878,719 B1
(45) Date of Patent: Feb. 1, 2011

(54) SLIDING LENS CAP

(75) Inventor: Shu-Mu Lin, Shulin (TW)

(73) Assignee: Shin Zu Shing Co., Ltd., Shulin, Taipei Hsien (TW)

( * ) Notice: Subject to any disclaimer, the term of this patent is extended or adjusted under 35 U.S.C. 154(b) by 0 days.

(21) Appl. No.: 12/586,983

(22) Filed: Sep. 30, 2009

(51) Int. Cl.
*G03B 11/04* (2006.01)

(52) U.S. Cl. ..................................... 396/448

(58) Field of Classification Search ......... 396/348–349, 396/448, 484, 490, 493; 359/511
See application file for complete search history.

(56) References Cited

U.S. PATENT DOCUMENTS

| | | | | |
|---|---|---|---|---|
| 4,847,648 A | * | 7/1989 | Yamaguchi et al. | 396/84 |
| 5,255,037 A | * | 10/1993 | Kobayashi | 396/459 |
| 5,432,576 A | * | 7/1995 | SanGregory et al. | 396/449 |
| 5,543,881 A | * | 8/1996 | Ito | 396/494 |
| 5,631,772 A | * | 5/1997 | Mizukawa | 359/511 |
| 5,862,426 A | * | 1/1999 | Ichino et al. | 396/448 |
| 6,926,453 B2 | * | 8/2005 | Hisamatsu | 396/349 |
| 7,507,042 B2 | * | 3/2009 | Yen | 396/448 |

FOREIGN PATENT DOCUMENTS

| | | | |
|---|---|---|---|
| JP | 2004004364 A | * | 1/2004 |
| JP | 2008164971 A | * | 7/2008 |

* cited by examiner

*Primary Examiner*—W. B. Perkey
*Assistant Examiner*—Leon W Rhodes
(74) *Attorney, Agent, or Firm*—Charles E. Baxley

(57) ABSTRACT

A sliding lens cap has a base, a driven cover, a driving cover, a linking bar and a sliding bracket. The base is mounted in front of the lens and has a lens hole aligning with the lens. The driven and driving covers are mounted pivotally to each other and selectively cover the lens hole. The linking bar and the sliding bracket are mounted pivotally to each other and are connected to the driven and driving covers. With such connection, a user opens and closes the covers by actuating the sliding bracket without touching the covers. Therefore, contact with the lens is prevented.

14 Claims, 9 Drawing Sheets

SLIDING LENS CAP

BACKGROUND OF THE INVENTION

1. Field of the Invention

The present invention relates to a sliding lens cap, especially to a lens cap mounted slidably in front of a lens to properly cap the lens when not in use.

2. Description of the Prior Arts

Lenses for cameras, video cameras, projectors and the like are high precision devices. To prevent damage and soiling, when not in use the lens should be capped by a lens cap.

Lens caps may be detachable lens caps, which selectively engages a perimeter of the lens. However, removed from the lens, the detachable cap may be mislaid, damaged or soiled. The latter instance causing transfer of dirt and dust to the lens defeating objectives of the lens cap. Although a string may connect the lens cap and lens, the lens cap may obscure a view of the lens, obstruct use of the camera or projector or be shaken, blown or knocked into the lens, damaging the lens and becoming a hazard in itself.

Lens caps may also be sliding lens caps. A conventional sliding lens cap is mounted slidably in front of the lens and may be powered or manual. The former costing more than the latter and being susceptible to damage or wear and tear and requiring servicing. Furthermore, incorrect operation of manual type lens caps may cause impact with and damage the lens.

To overcome the shortcomings, the present invention provides a sliding lens cap for lens to mitigate or obviate the aforementioned problems.

SUMMARY OF THE INVENTION

The main objective of the present invention is to provide a sliding lens cap that is easily operated and protects the lens. The sliding lens cap has a base, a driven cover, a driving cover, a linking bar and a sliding bracket. The base is mounted in front of the lens and has a lens hole aligning with the lens. The driven and driving covers are mounted pivotally to each other and selectively cover the lens hole. The linking bar and the sliding bracket are mounted pivotally to each other and are connected to the driven and driving covers. With such connection, the user opens and closes the covers by actuating the sliding bracket without touching the covers. Therefore, touching the lens is prevented.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
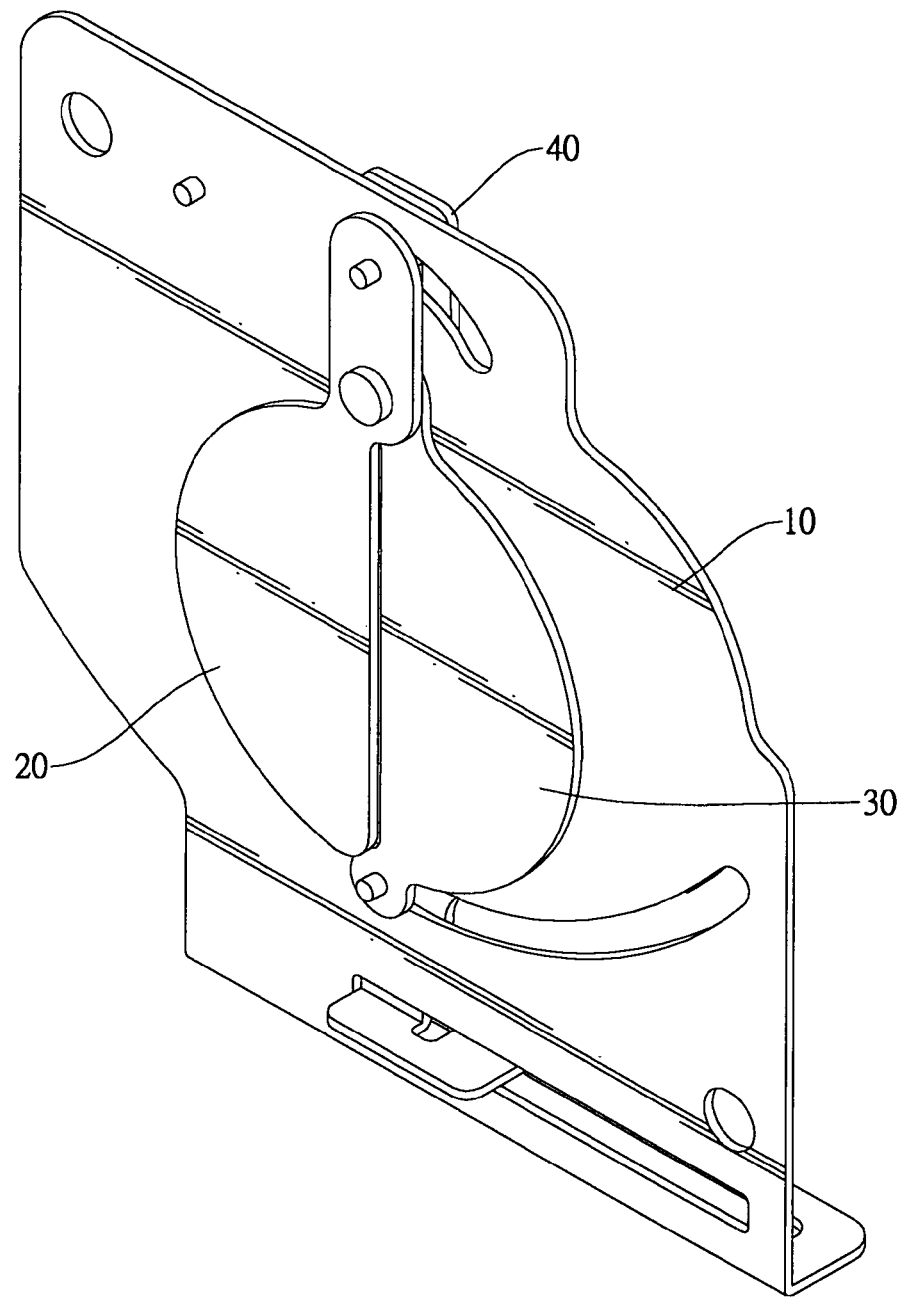
FIG. 1 is a perspective view of a sliding lens cap in accordance with the present invention.
Figure 2:
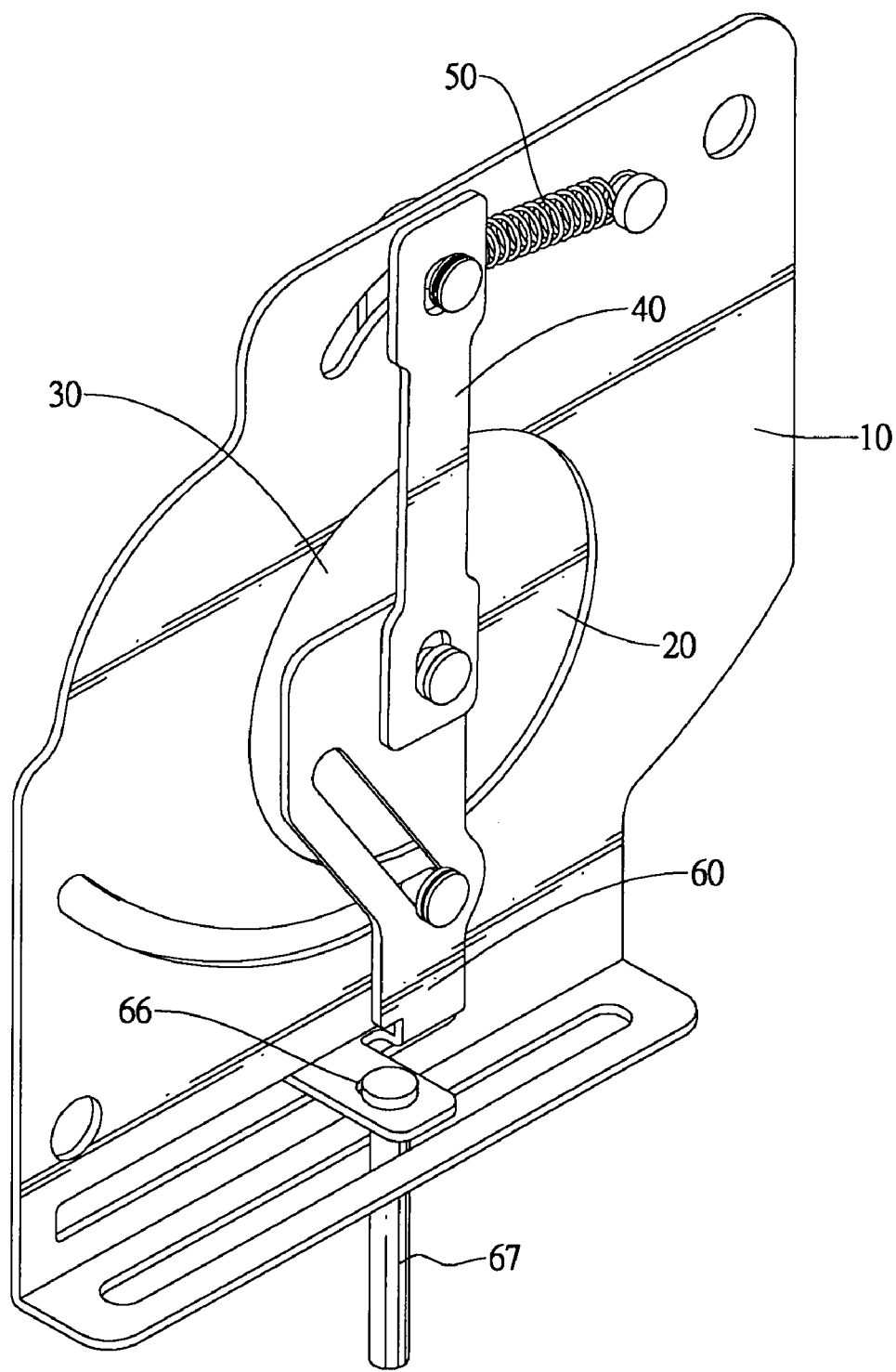
FIG. 2 is another perspective view of another embodiment of a sliding lens cap in accordance with the present invention.

With reference to FIGS. 1 and 2, a sliding lens cap in accordance with the present invention comprises a base (10), a driven cover (20), a driving cover (30), a linking bar (40), a resilient element (50) and a sliding bracket (60).

Figure 3:
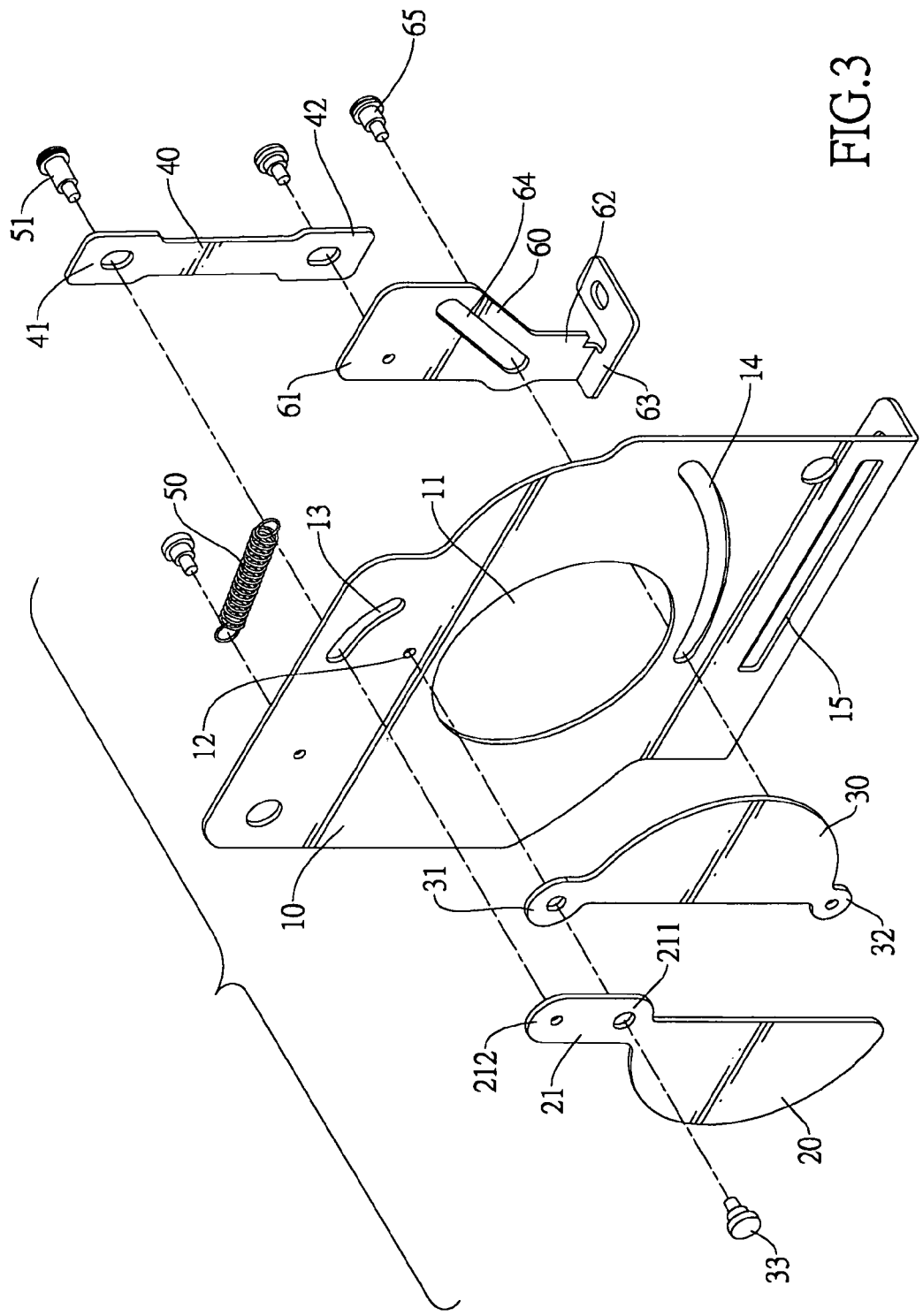
FIG. 3 is an exploded perspective view of the sliding lens cap in FIG. 1.
Figure 4:
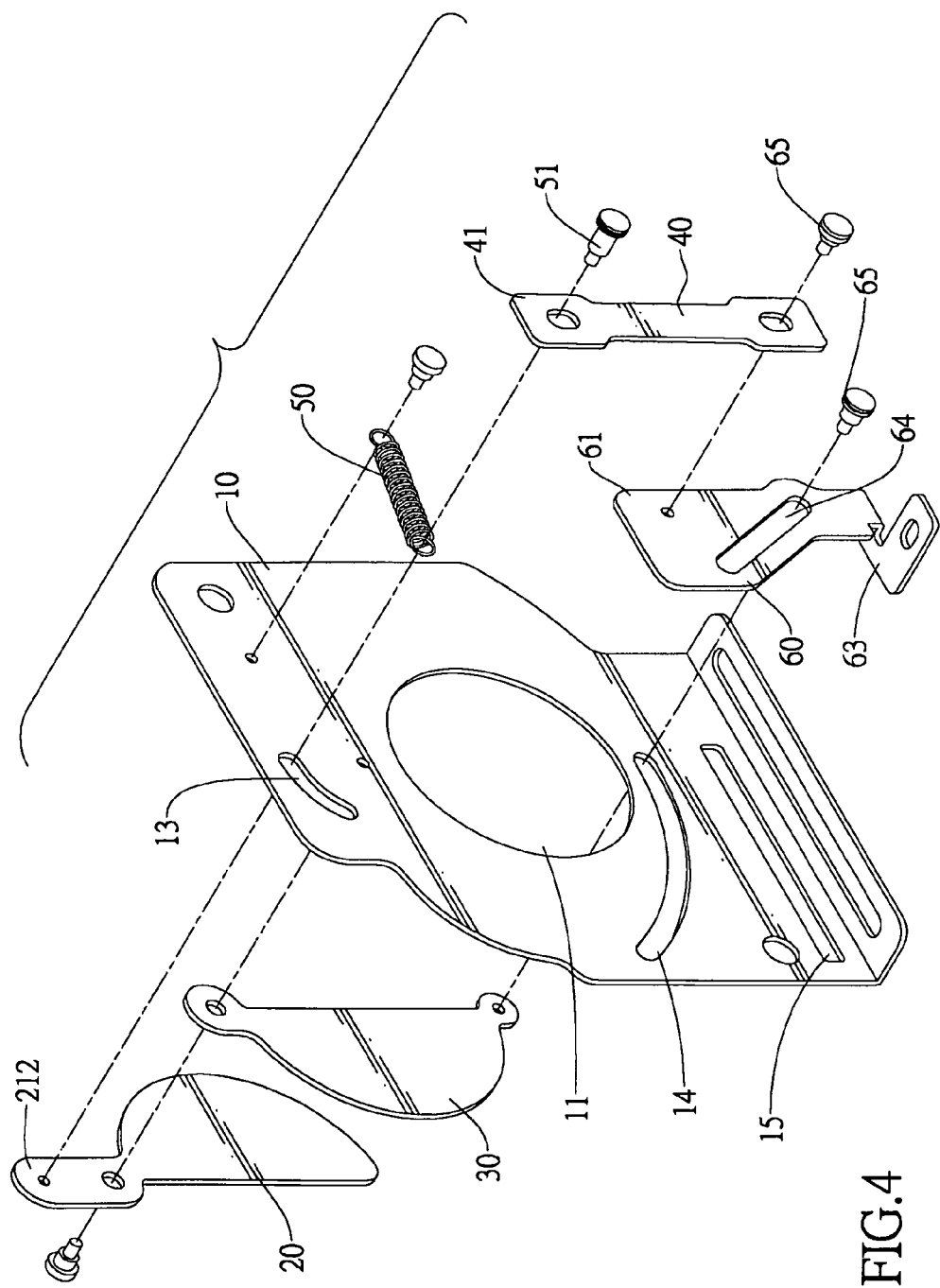
FIG. 4 is another exploded perspective view of the sliding lens cap in FIG. 1.

With reference to FIGS. 3 and 4, the base (10) has a lens hole (11), a pivoting hole (12), a limiting slot (13), a guiding slot (14) and an actuating slot (15) formed therethrough. The lens hole (11) is formed between the limiting slot (13) and the guiding slot (14). The guiding slot (14) is formed between the actuating slot (15) and the lens hole (11). The pivoting hole (12) is formed between the limiting slot (13) and the lens hole (11). The lens hole (11) is circular. The limiting slot (13) and the guiding slot (14) are curved.

The driven cover (20) is mounted pivotally on a front surface of the base (10), may be semicircular, selectively caps part of the lens hole (11) and has a connecting tab (21). The connecting tab (21) extends out from an edge of the driven cover (20) and has a proximal end (211) and a distal end (212). The proximal end (211) is connected pivotally to the pivoting hole (12) of the base (10). The distal end (212) is connected slidably to the limiting slot (13) of the base (10).

The driving cover (30) is mounted pivotally on the front surface of the base (10), is connected pivotally to the driven cover (20), may be semicircular, selectively covers part of the lens hole (11) and has a pivoting end (31) and a guiding end (32). A pivoting pin (33) is mounted through the pivoting end (31) of the driving cover (30) and the proximal end (211) of the driven cover (20) and is mounted pivotally in the pivoting hole (12) of the base (10) to pivotally connect the driving cover (30) and the driven cover (20). The guiding end (32) of the driving cover (30) is connected slidably to the guiding slot (14).

The linking bar (40) is mounted on a rear surface of the base (10), is connected pivotally to the driven cover (20) and has a limiting end (41) and a pivoting end (42). The limiting end (41) of the linking bar (40) is connected to the distal end (212) of the connecting tab (21) of the driven cover (20) through the limiting slot (13) of the base (10).

The resilient element (50) is mounted on the rear surface of the base (10) and has two ends. One of the ends of the resilient element (50) is mounted securely on the base (10). The other of the ends of the resilient element (50) is connected securely to the limiting end (41) of the linking bar (40) and the distal end (212) of the connecting tab (21) of the driven cover (20). The resilient element (50) may be a spring. A limiting pin (51) is mounted through the limiting end (41) of the linking bar (40), the resilient element (50) and the limiting slot (13) in sequence and is connected securely to the distal end (212) of the connecting tab (21).

The sliding bracket (60) is mounted on the rear surface of the base (10), is connected pivotally to the linking bar (40) and has a pivoting end (61), a sliding end (62) and an inclined slot (64). The pivoting end (61) of the sliding bracket (60) is connected pivotally to the pivoting end (42) of the linking bar (40). The inclined slot (64) is formed through the sliding bracket (60). A sliding pin (65) is mounted slidably through the inclined slot (64) of the sliding bracket (60) and the guiding slot (14) of the base (10) and is connected pivotally to the guiding end (32) of the driving cover (30).

To move the sliding bracket (60) easily, the sliding bracket (60) may have a protrusion (63). The protrusion (63) is formed transversely on the sliding end (62) of the sliding bracket (60). The protrusion may be mounted through the actuating slot (15) of the base (10) and may protrude out from the front surface of the base (10). The protrusion (63) may have a through hole (66). A push rod (67) is mounted through the through hole (66).

The pivoting pin (33), the limiting pin (51) and the sliding pin (65) may be substituted by other structures. For example, the pivoting pin (33) may be integrated with the driven cover (20) or the driving cover (30). The limiting pin (51) may be integrated with the linking bar (40) or the driven cover (20). The sliding pin (65) may be integrated with the driving cover (30).

Figure 5:
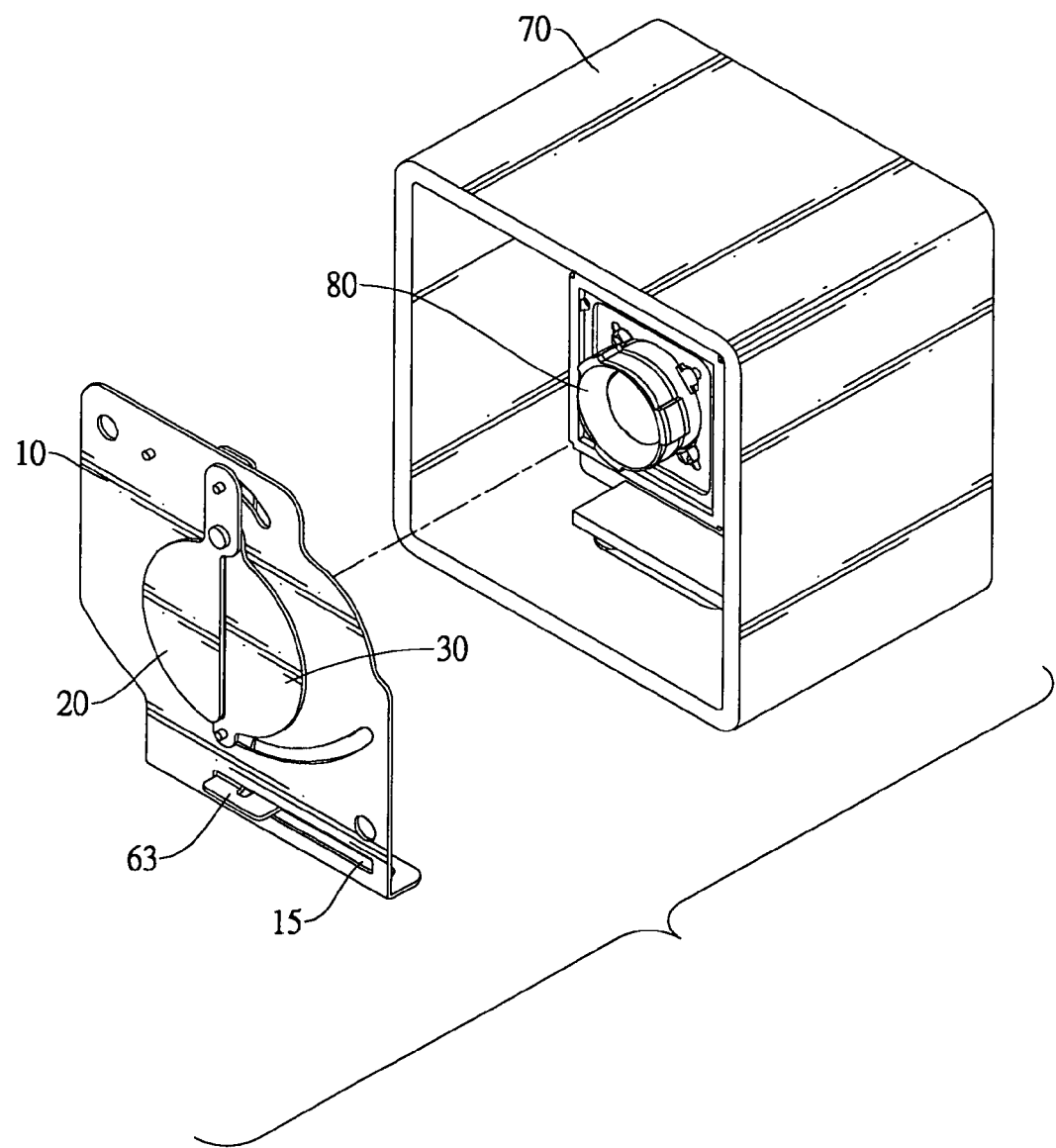
FIG. 5 is an operational exploded perspective view of the sliding lens cap, shown mounted in front of the lens.

With reference to FIGS. 2, 3 and 5, the sliding lens cap as described may be mounted on a case (70) of an electronic device in front of a lens (80). The base (10) is attached securely to the case (70). The lens hole (11) of the base (10) aligns with the lens (80). When the driven and driving covers (20, 30) are closed, the lens hole (11) is completely covered by the driven and driving covers (20, 30) to protect the lens (80). The user closes the driven and driving covers (20, 30) by actuate the sliding bracket (60). The sliding bracket (60) may protrude out of the case (70), the protrusion (63) may protrude out of the front surface of the base (10), or the push rod (67) may protrude out of the case (70) for the user to move the sliding bracket (60).

Figure 6:
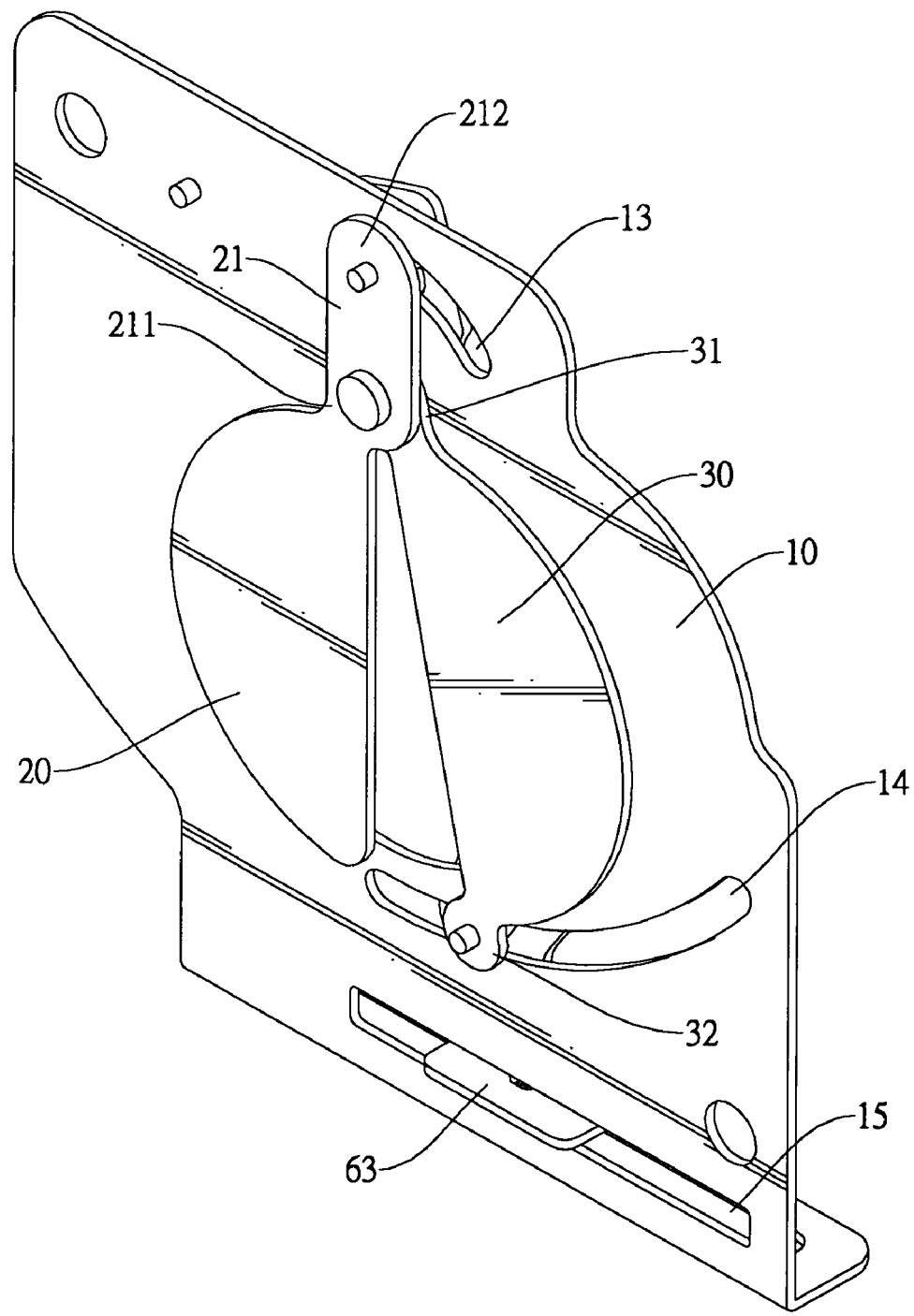
FIG. 6 is an operational perspective view of the sliding lens cap for lens, shown covers half-opened.
Figure 7:
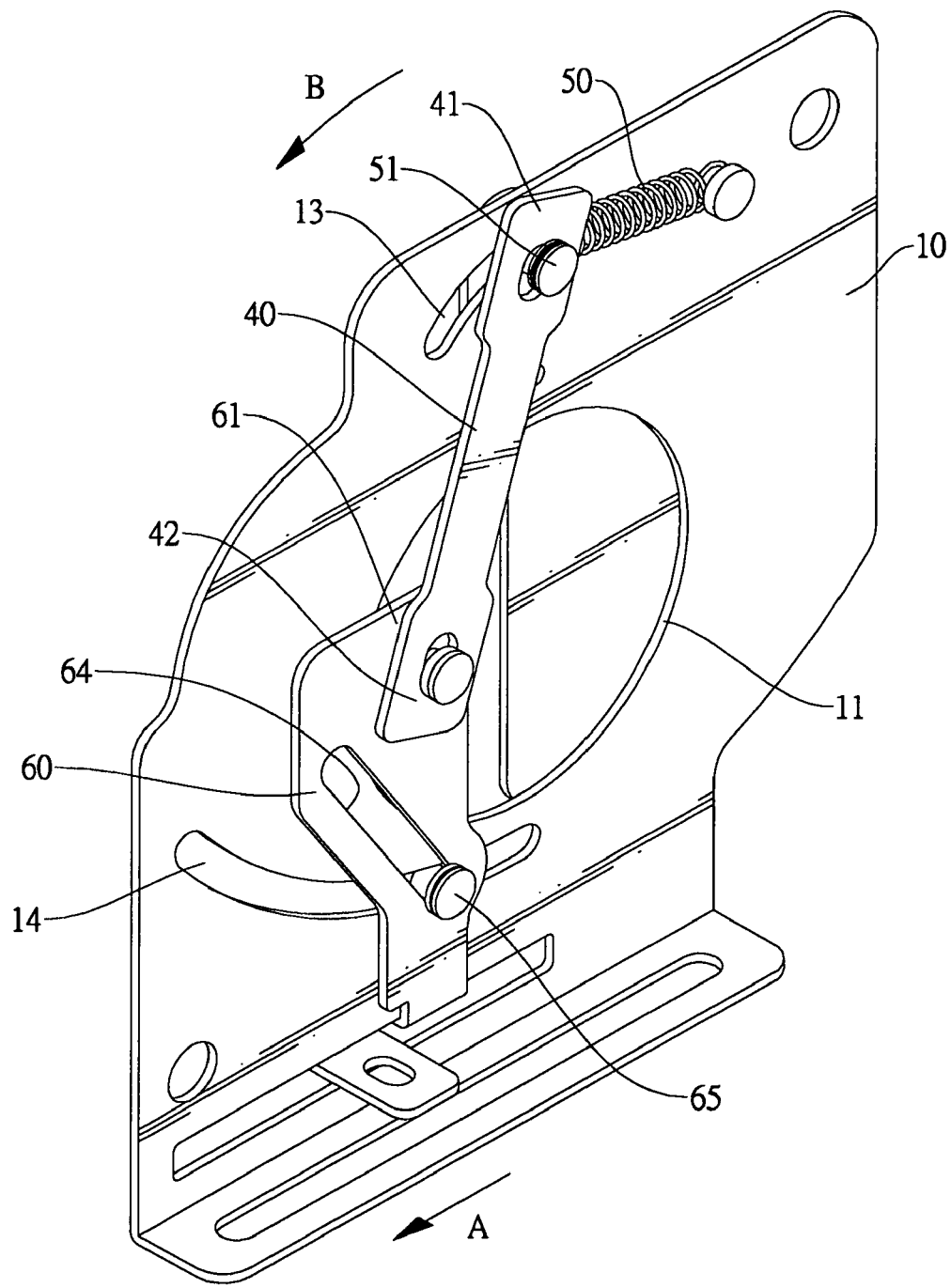
FIG. 7 is another operational perspective view of the sliding lens cap for lens, shown the covers half-opened.

With further reference to FIGS. 6 and 7, the sliding lens cap as described is actuated to reveal the lens (80). The protrusion (63) is moved toward a first direction A to slide the sliding pin (65) along the guiding slot (14) of the base (10). Then the sliding bracket (60) is moved toward the first direction A to pivot the linking bar (40) and the driving cover (30).

Figure 8:
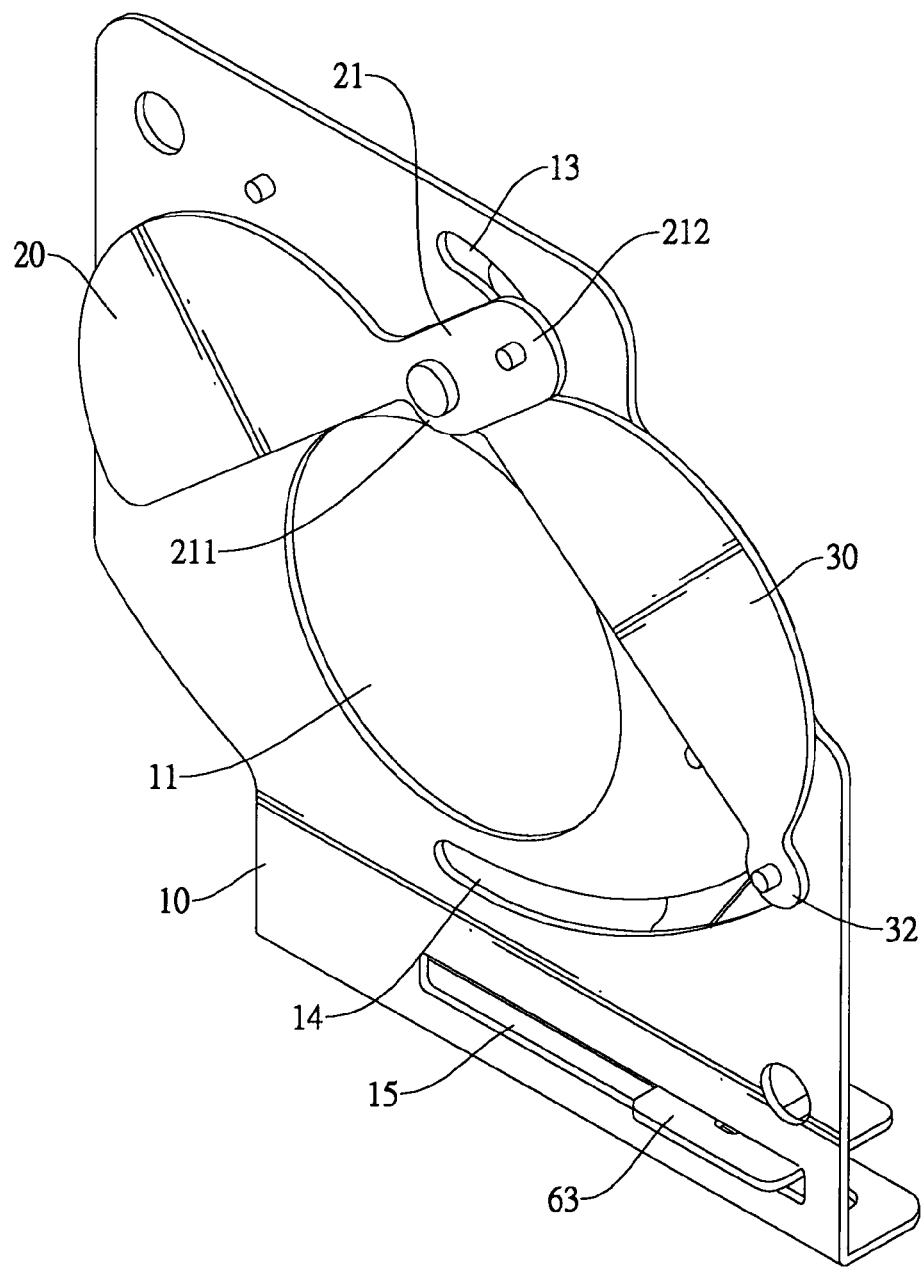
FIG. 8 is an operational perspective view of the sliding lens cap for lens, shown the covers fully opened.
Figure 9:
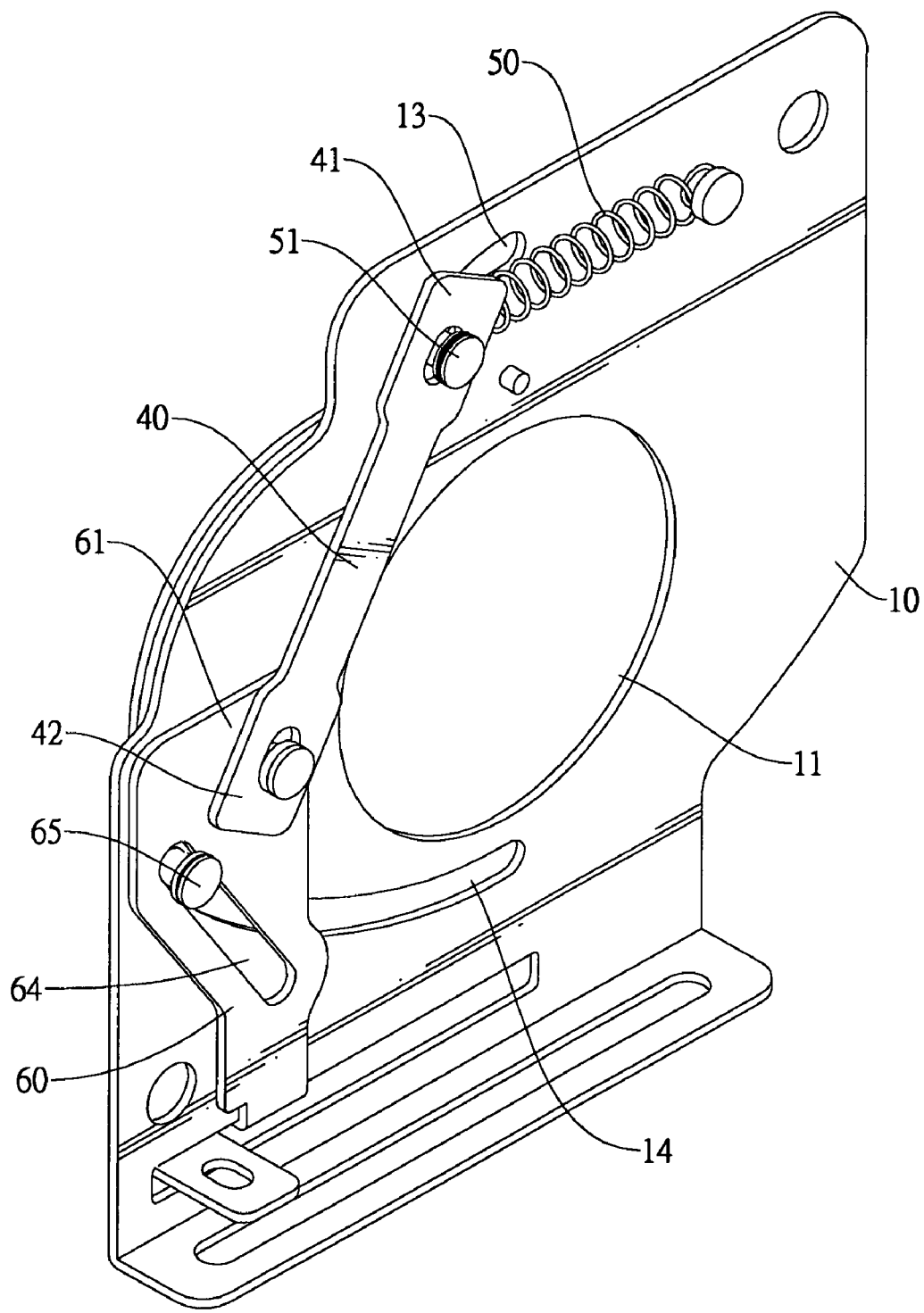
FIG. 9 is another operational perspective view of the sliding lens cap for lens, shown the covers fully opened.

With further reference to FIGS. 8 and 9, when the linking bar (40) is pivoted to the dead end, continually moving the sliding bracket (60) forces the linking bar (40) to move transversely. The sliding pin (65) is slid along the guiding slot (14) of the base (10) and the inclined slot (64) of the sliding bracket (60). Since the limiting pin (51) is connected pivotally to the distal end (212) of the connecting tab (21) and the proximal end (211) is connected pivotally to the pivoting hole (12) of the base (10) via the pivoting pin (33), the limiting pin (51) is moved along the limiting slot (13) of the base (10) toward a second direction B. Therefore, the connection as described above forces the driven and driving covers (20, 30) to pivot simultaneously until the lens hole (11) of the base (10) is fully opened and the lens (80) is revealed.

When the limiting pin (51) moves toward the second direction B, the resilient element (50) is pulled to extend. The coefficient of elasticity of the resilient element (50) is predetermined so that the returning force of the resilient element does not act when the driven and driving covers (20, 30) are fully opened. However, when the driven and driving covers (20, 30) are closing, the resilient element (50) provides returning force to assist the driven and driving covers (20, 30) back. The sliding lens cap as described may comprise an appropriate positioning member to hold the driven and driving covers (20, 30) when fully opened.

The sliding lens cap as described has following advantages. With the sliding bracket (60) and the connection between the driven cover (20), the driving cover (30) and the linking bar (40), the driven and driving covers (20, 30) are opened without being touched. Therefore, accidental contact with the lens (80) is prevented. Furthermore, the sliding lens cap as described is easily operated and has simplified structure.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A sliding lens cap comprising
   a base having
      a limiting slot formed through the base;
      a guiding slot formed through the base;
      a lens hole formed through the base and formed between the limiting slot and the guiding slot;
   a driven cover mounted pivotally on a front surface of the base and selectively covering part of the lens hole;
   a driving cover mounted pivotally on the front surface of the base, connected pivotally to the driven cover, selectively covering part of the lens hole and connected pivotally to the driven cover;
   a linking bar mounted on a rear surface of the base and connected pivotally to the driven cover through the limiting slot of the base;
   a resilient element mounted on the rear surface of the base and having
      two ends, one end of the resilient element mounted securely on the base and the other connected securely to the linking bar and the driven cover;
   a sliding bracket mounted on the rear surface of the base, connected pivotally to the linking bar and having an inclined slot formed through the sliding bracket; and
   a sliding pin mounted slidably through the inclined slot of the sliding bracket and the guiding slot of the base and connected pivotally to the driving cover.

2. The sliding lens cap as claimed in claim 1, wherein
   the driving cover has
      a pivoting end connected pivotally to the driven cover; and
      a guiding end connected to the guiding slot of the base;
   the linking bar has
      a limiting end connected to the driven cover through the limiting slot of the base; and
      a pivoting end;
   the sliding bracket has
      a pivoting end of the sliding bracket connected pivotally to the pivoting end of the linking bar; and
      a sliding end; and
   the sliding pin is connected to the guiding end of the driving cover.

3. The sliding lens cap as claimed in claim 2, wherein
   the driven cover has a connecting tab extending out from an edge of the driven cover and having a proximal end and a distal end;
   the pivoting end of the driving cover is connected pivotally to the proximal end of the connecting tab;
   the limiting end of the linking bar is connected pivotally to the distal end of the connecting tab through the limiting slot of the base;
   the resilient element is connected to the limiting end of the linking bar and the distal end of the connecting tab.

4. The sliding lens cap as claimed in claim 3 further comprising a limiting pin mounted through the limiting end of the linking bar, the resilient element and the limiting slot in sequence and connected securely to the distal end of the connecting tab.

5. The sliding lens cap as claimed in claim 4, wherein
   the base has a pivoting hole formed therethrough and formed between the limiting slot and the lens hole; and
   a pivoting pin mounted through the pivoting end of the driving cover and the proximal end of the connecting tab and mounted pivotally in the pivoting hole of the base.

6. The sliding lens cap as claimed in claim 5, wherein
   the base has an actuating slot formed therethrough; and
   the sliding bracket has a protrusion formed transversely thereon, mounted through the actuating slot of the base and protruding out of the front surface of the base.

7. The sliding lens cap as claimed in claim 6, wherein the guiding slot of the base is formed between the actuating slot and the lens hole.

8. The sliding lens cap as claimed in claim 7, wherein
   the lens hole of the base is circular;
   the limiting slot and the guiding slot of the base are curved; and
   the driven and driving covers are semicircular.

9. The sliding lens cap as claimed in claim 5, wherein the sliding bracket has
   a protrusion formed transversely thereon;
   a through hole formed through the protrusion; and
   a push rod mounted through the through hole.

10. The sliding lens cap as claimed in claim 9, wherein
    the lens hole of the base is circular;
    the limiting slot and the guiding slot of the base are curved; and
    the driven and driving covers are semicircular.

11. The sliding lens cap as claimed in claim 1, wherein
    the base has an actuating slot formed therethrough; and
    the sliding bracket has a protrusion formed transversely thereon, mounted through the actuating slot of the base and protruding out of the front surface of the base.

12. The sliding lens cap as claimed in claim 11, wherein the guiding slot of the base is formed between the actuating slot and the lens hole.

13. The sliding lens cap as claimed in claim 1, wherein the sliding bracket has
    a protrusion formed transversely thereon;
    a through hole formed through the protrusion; and
    a push rod mounted through the through hole.

14. The sliding lens cap as claimed in claim 1, wherein
    the lens hole of the base is circular;
    the limiting slot and the guiding slot of the base are curved; and
    the driven and driving covers are semicircular.

* * * * *